Feb. 3, 1970  D. R. CANTRELL  3,492,916
APPARATUS AND METHOD FOR CUTTING A RADIUS TOOTHED GEAR
Filed Jan. 22, 1968  5 Sheets-Sheet 1
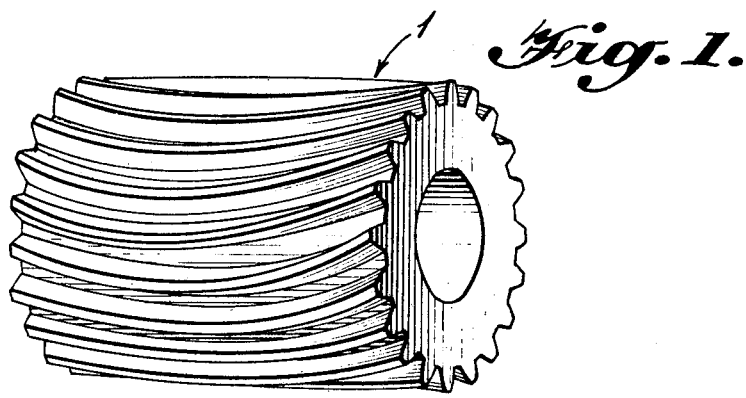
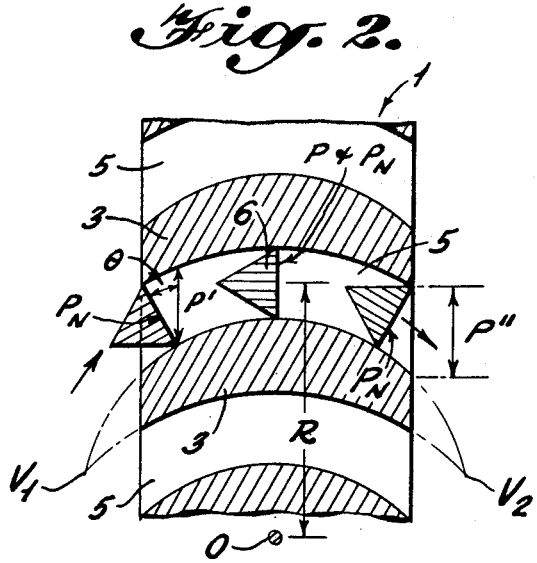
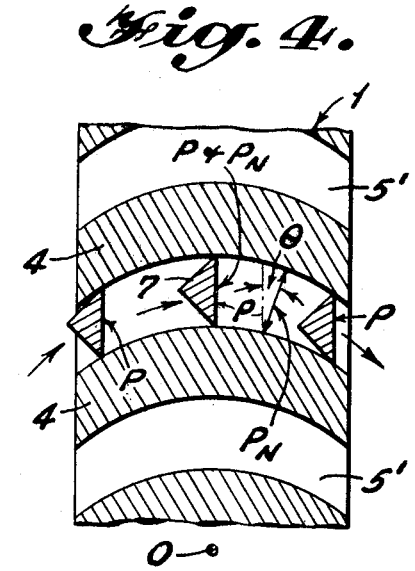
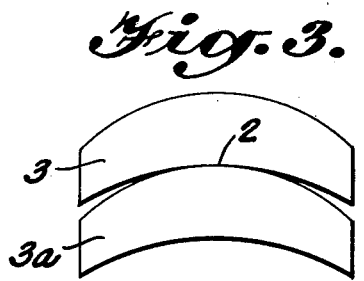
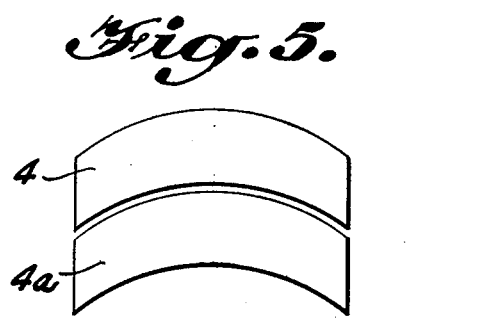
INVENTOR
DAN R. CANTRELL
BY Stevens, Davis, Miller & Mosher
ATTORNEYS

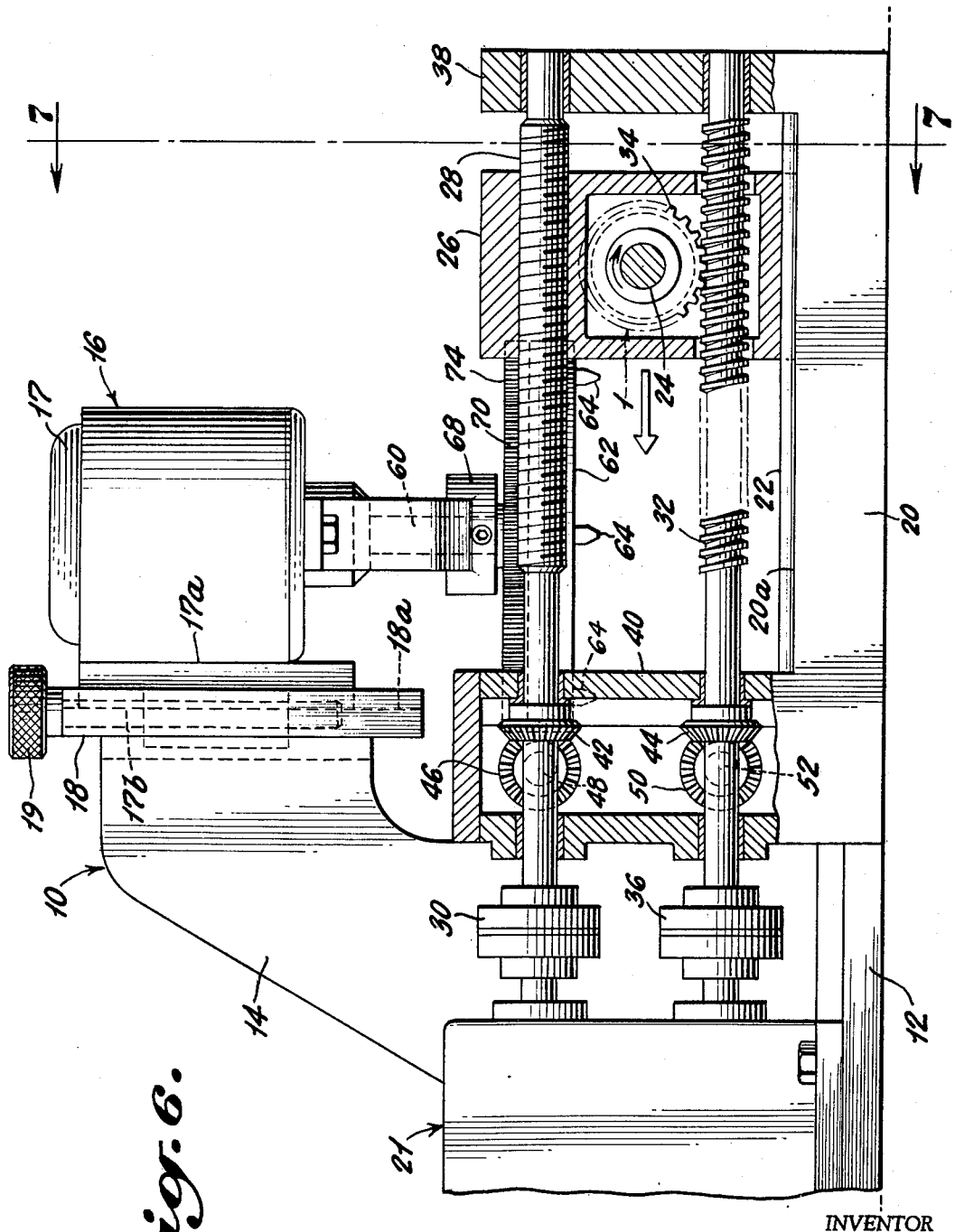

INVENTOR
DAN R. CANTRELL
BY Stevens, Davis, Miller & Mosher
ATTORNEYS

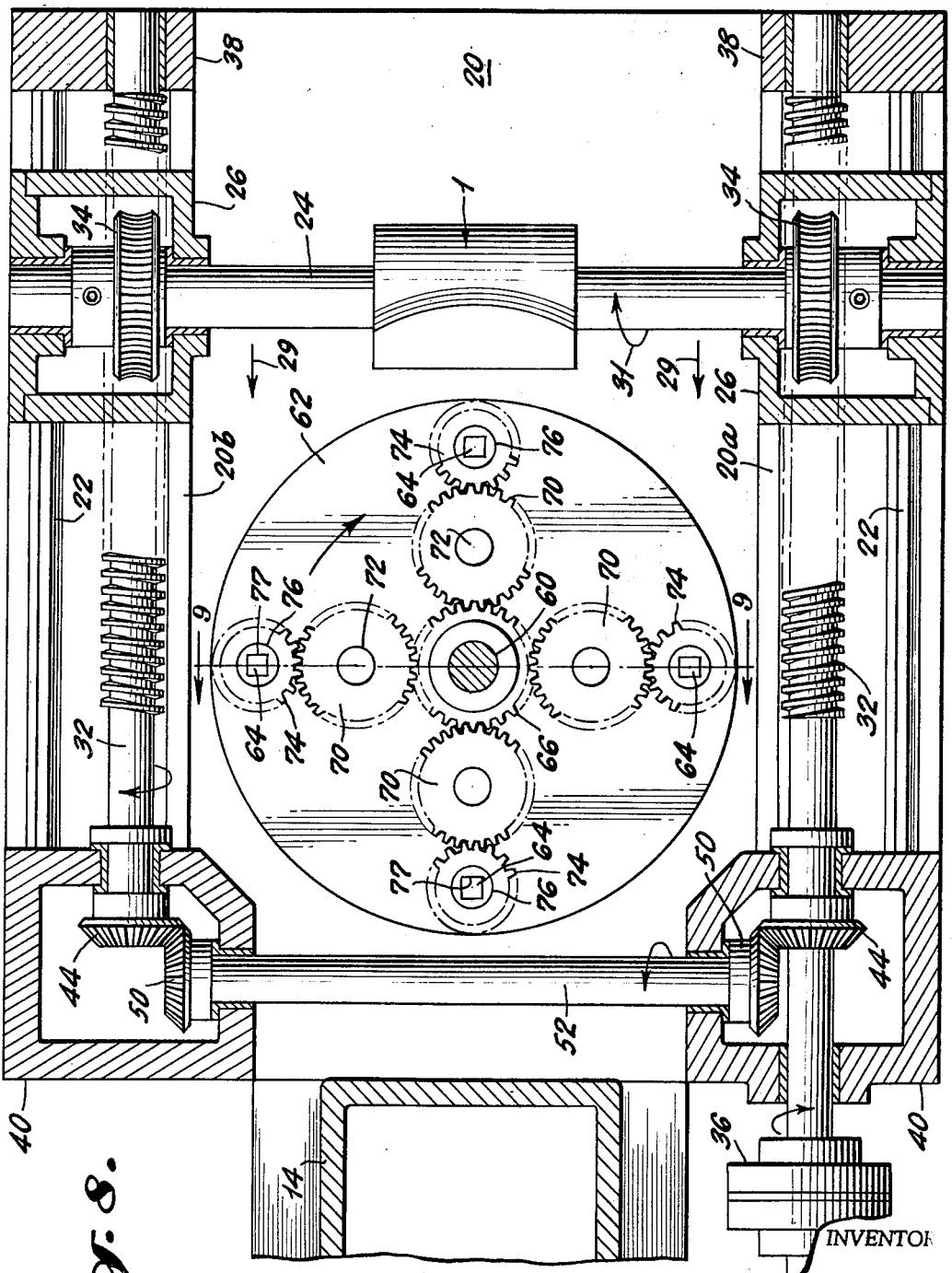

Feb. 3, 1970   D. R. CANTRELL   3,492,916
APPARATUS AND METHOD FOR CUTTING A RADIUS TOOTHED GEAR
Filed Jan. 22, 1968   5 Sheets-Sheet 5

INVENTOR
DAN R. CANTRELL

BY Stevens, Davis, Miller & Mosher
ATTORNEYS

United States Patent Office 3,492,916
Patented Feb. 3, 1970

3,492,916
APPARATUS AND METHOD FOR CUTTING A
RADIUS TOOTHED GEAR
Dan R. Cantrell, Brookside Apartments, Apt. A,
Dixon, Tenn.
Filed Jan. 22, 1968, Ser. No. 699,700
Int. Cl. B23f 9/10
U.S. Cl. 90—5                                   6 Claims

ABSTRACT OF THE DISCLOSURE

An apparatus and method for continually feeding a gear blank into the path of at least one cutter blade rotating in an arcuate path about a fixed point. During this rotation, the gear blank is axially translated and rotated with respect to the cutter blade while the leading edge of the cutter blade is constantly maintained perpendicular to the axis of the gear blank.

BACKGROUND OF THE INVENTION

Field of the invention

The present invention relates to an apparatus and method for cutting a gear, and more particularly, to an apparatus and method for continually cutting a radius toothed gear having an involute profile.

Prior art

The advantages of a radial toothed gear have generally been recognized. For example, it is known that the radius toothed gear makes possible a smoother load transfer from tooth to tooth than in other known type gears, as well as a larger load carrying ability. Also, the radius toothed gears are self aligning and therefore eliminate side thrusts, in addition to making it possible to effect a power transmission between non-parallel shafts. The majority of the prior art which has recognized the advantages of radius toothed gears has manufactured them by sweeping a rotating member over the arc of the radius gear with the cutter blade fixed to the rotating member so that the distance between the teeth measured along a line normal to the tooth of the generated gear, i.e., the normal circular pitch, is constant.

In the above manner, since the angle between the face of the tooth at any point and the axis of the gear will increase as the arc is swept from the center of the gear to the edge, the circular pitch, or the distance measured along the arc of the pitch circle between corresponding points on adjacent teeth will vary. In other words, the tooth thickness varies along different points of the arc swept by the fixed cutter. Therefore, when two adjacent gears mesh, they have a relatively small amount of contact during meshing. (For the purposes of this application, it is understood that the above definitions of the circular pitch P and the normal pitch $P_N$ are actually one-half of their common textbook definitions, in the interest of clarity.)

It would therefore appear highly desirable to hold the circular pitch constant and vary the normal circular pitch with the above-mentioned angle during the cutting operation in order that gear teeth of uniform thickness throughout their entire curvature can be formed. However, the prior art does not teach any mechanism or apparatus that can effectively, inexpensively, and continually effect the cutting of a radius gear tooth in this manner.

SUMMARY OF THE INVENTION

It is therefore an object of the present invention to provide an apparatus and method for cutting a radius toothed gear in which the circular pitch, and therefore the thickness of the teeth, of the generated gear is constant.

Briefly summarized, the present invention provides an apparatus and method for continually feeding a gear blank into the path of at least one cutter blade rotating in an arcuate path while axially translating and rotating the gear blank with respect to the cutter blade and constantly maintaining the leading face of the cutter blade perpendicular to the axis of the gear blank.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope. In the drawings:

FIG. 1 is a perspective view of a typical radius toothed gear;

FIGS. 2 and 3 are diagrammatic views of a radius toothed gear cut in a conventional manner; FIG. 2 is a fragmentary view, depicting a series of gear teeth developed in a plan view with the teeth being shown in cross section, and FIG. 3 shows the mating surfaces of a pair of engaging gear teeth;

FIGS. 4 and 5 are views similar to FIGS. 2 and 3, respectively, but depicting gears cut according to the present invention;

FIG. 6 is a side view, partially in section, of the apparatus of the present invention;

FIG. 8 is a horizontal sectional view taken along line 8—8 of FIG. 7;

DESCRIPTION OF THE PREFERRED EMBODIMENTS

Figure 7:
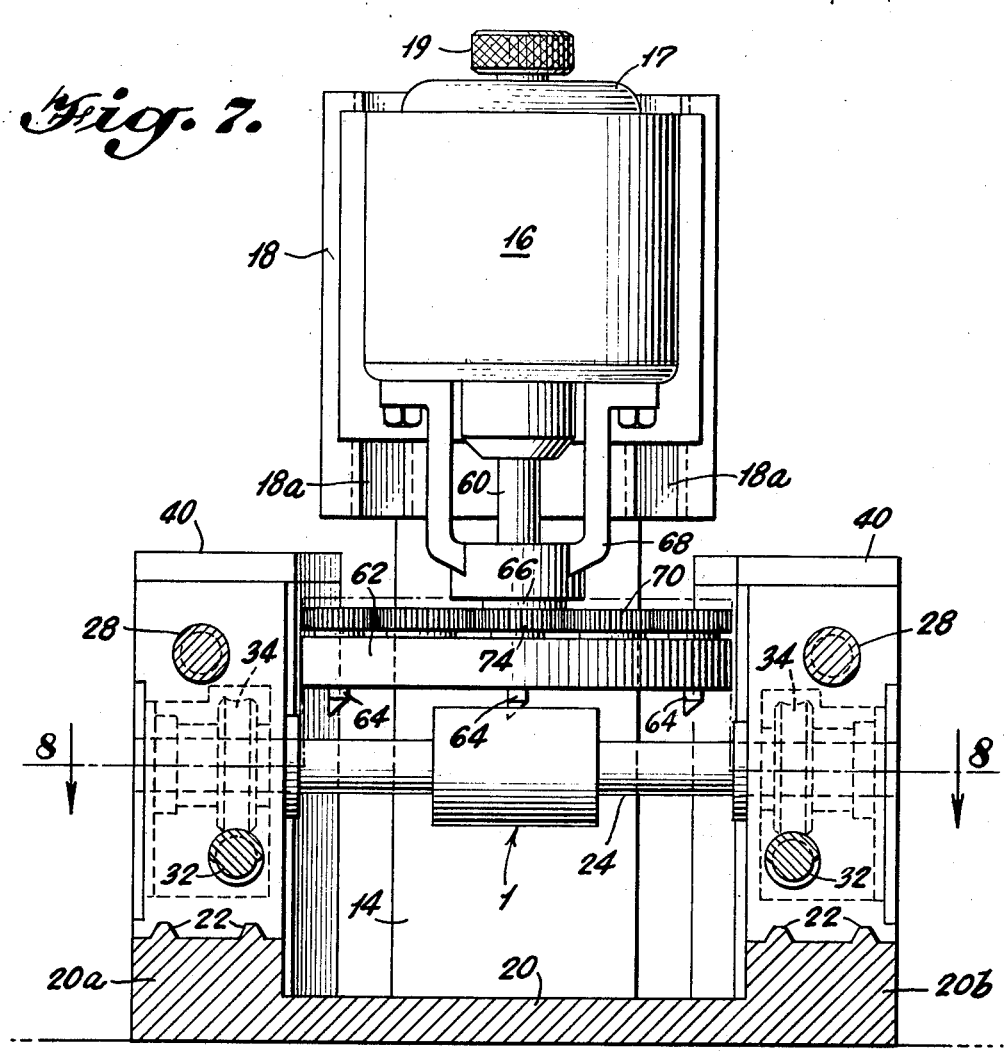
FIG. 7 is a vertical sectional view taken along line 7—7 of FIG. 6.

Referring specifically to FIG. 1 of the drawings, the reference numeral 1 refers in general to a radius toothed gear which is provided with a plurality of teeth having an involute profile and a general arcuate shape.

FIGS. 2 and 3 illustrate a portion of a radius toothed gear cut in a generally known manner. In FIG. 2 the radius toothed gear 1 has a plurality of teeth 3 shown in section, the tooth spaces being shown at 5. These spaces are cut out by means of a cutting tool 6 which is fixed to an arm or the like, not shown, which is rotated about a point, such as O which is termed the center of curvature and which is external of the tooth space. The radius of curvature, or the distance between the center of curvature and the center of the tooth space is represented by the distance R.

The cutting tool 6 is also shown in sectional view, it being understood that it can take any generally known shape within the limitations inherent in the shape of the teeth desired. For the purposes of illustration, the leading face of the cutting tool is shown by the darkened lines in FIG. 2. As shown in FIG. 2, the circular pitch P as defined above coincides with the normal circular pitch $P_N$ at the center of the tooth only.

It is thus seen that with the cutting tool fixed to an arm which rotates about point O, $P_N$ will remain constant throughout the length of the tool space as the angle between the face of the tooth at any point and the axis of the gear blank increases. This angle can also be defined as the angle that a line normal to the wall of a tooth makes with a line perpendicular to the gear axis, and is shown in FIGS. 2 and 4 by $\theta$. This constant $P_N$ causes the circular pitch P, or thickness of the tooth space to vary as shown by P, P', and P", resulting in a crescent-shaped tooth, the sides of which converge to points $V_1$ and $V_2$ as shown in FIG. 2. Therefore, when the teeth 3 and 3a of the two meshing gears engage as shown in FIG. 3, this variation in thickness of the teeth results in a relatively small area of contact generally shown at 2 between the engaging teeth.

In FIGS. 4 and 5 the arrangement of the present invention is illustrated, in which a cutting tool 7 generates a plurality of teeth 4. As shown, the cutting tool 7 moves with respect to the rotating arm so that the cutting tool, and therefore $P_N$, will vary during all positions of the rotating arm, or variations in angle $\theta$. Therefore, P will remain constant throughout the entire length of the generated space 5' between adjacent teeth, resulting in a uniform thickness of each tooth 4.

Therefore, when two corresponding teeth 4 and 4a of meshing gears engage as shown in FIG. 5, a line contact is achieved throughout the entire length of the tooth, which therefore is clearly a distinct improvement over the arrangement shown in FIGS. 2 and 3.

The apparatus for effecting the above type of cut is better illustrated in FIGS. 6–9.

Referring specifically to these figures, the reference numeral 10 refers to a modified milling machine, or the like, including a base member 12 with a support 14 extending generally upwardly therefrom. A head assembly 16, comprising an electric motor 17 attached to bracket 17a, is connected to the support 14 by means of dovetail keys 17b sliding in mating keyways 18a in support slide assembly 18. The vertical position of the head assembly 16 is adjustable with respect to the support 14 by means of manually rotating the knurled thumb screw 19.

A motor and transmission drive 21 is disposed to one side of the support assembly and is utilized to drive means imparting both rotation and translation to a gear blank as will be explained in greater detail later. Extending to either side and below the head assembly 16 and forward from support 14, is a pair of horizontal parallel trackways 20a and 20b, each having at least two guide rails 22 formed thereon. Said tracks are formed integral with base 20, which is rigid with respect to support 14.

A support shaft 24 for the gear blank 1 is mounted at each end in a pair of housing members 26 which slidably engage the trackways 20a and 20b. This latter movement is effected by means of a pair of threaded power screws 28 threadably engaging their respective threaded housing members 26 and being connected to the power transmission drive 21 by means of coupling members 30 so that rotation of the power screws 28 from the motor-transmission drive 21 effects a translatory movement of housing member 26, support shaft 24, and gear blank 1, in a direction from right to left, as shown by arrows 29 in FIGS. 6 and 8 during operation of the mechanism, and in the opposite direction during return to a starting position.

In order to impart a rotary movement to the gear blank 1 in addition to the above-described translatory movement, a pair of worm shafts 32 are also provided to either side of the head assembly 16, the shafts extending generally below power screws 28 and being coupled to the motor-transmission drive 21 by coupling members 36. Shafts 32 engage a pair of respective worm gears 34 fixed to the ends of support shaft 24 and rotatably mounted in housing members 26. The ends of the threaded power screws and the shafts 32 are rotatably mounted in end supports 38 extending upwardly from the ends of tracks 20a and 20b as shown. Arrow 31 in FIG. 8 notes the direction of rotation of the assembly during operation of the mechanism, i.e., when the translation of the assembly is in the direction indicated by arrow 29.

In order to transmit power from the threaded power screws 28 and worm shaft 32 shown in FIG. 6, or those on the left side of FIG. 7 to those shown on the right side of FIG. 7, a beveled gear 42 is provided on each of the threaded power screws 28 which respectively engage a corresponding beveled gear 46 formed on a transmission shaft 48 operatively connecting the power screws 28. In a similar manner beveled gears 44 are provided on worm shafts 32 which engage corresponding beveled gears 50 fixed to transmission shafts 52 in order to operatively connect the worm shafts 32. A housing 40 may be provided for each of the above-mentioned beveled gear arrangements, in which case the respective power screws 28 and worm shafts 32 rotatably extend therethrough.

The motor-transmission drive 21 speed is selected to effect a predetermined synchronized rotation and translation of gear blank 1 with respect to the head assembly 16, and may be varied to suit the requirements of other gear specifications.

Figure 9:
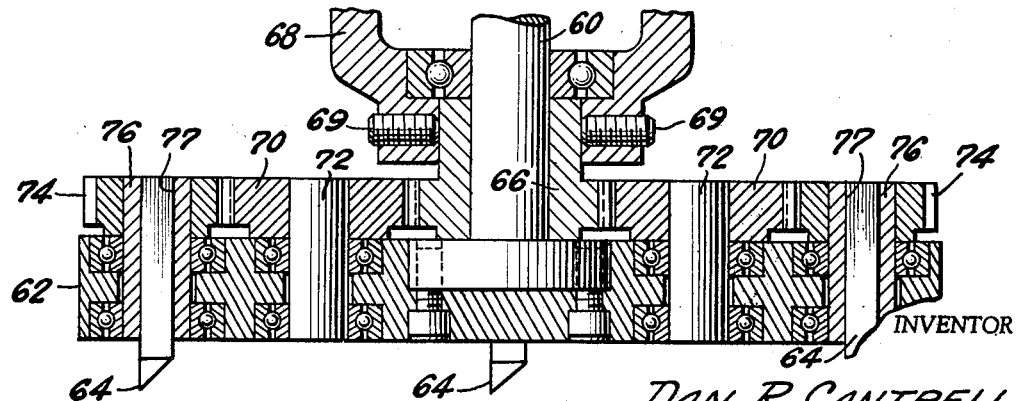
FIG. 9 is an enlarged vertical sectional view taken along line 9—9 of FIG. 8, showing in particular the cutter disc and gear assembly of the present invention.

The head assembly 16 includes a shaft 60 extending downwardly therefrom and adapted to rotate by any known arrangement. A cutter disc 62 is fixed to shaft 60 as shown in FIGS. 7–9, and carries a plurality of cutting tools 64 in a manner that will be described in detail hereinafter.

In order to maintain the face of the cutting tools 64 perpendicular to the axis of the gear blank in all positions of a given cutter blade as it cuts an arcuate shaped gear in blank 1, the following gear arrangement is assembled with respect to cutter disc 62. As better shown in FIGS. 8 and 9, a stationary gear 66 is rotatably mounted on shaft 60 and held by set screws 69 in support 68 which is rigidly attached to head assembly 16 and which maintains gear 66 in a fixed relation with respect to the rotating shaft 60 and cutter disc 62. A plurality of idler gears 70 and with shafts 72 are journaled in suitable bearings in disc 62 in engagement with stationary gear 66 and chuck gears 74. These chuck gears 74 extend radially outwardly from their respective cooperating idler gears 70 in engagement therewith. Chuck gears 74 are attached to shafts 76 which are rotatably journaled in disc 62 and are provided with suitable apertures 77 to rigidly hold cutting tools 64. As shown in FIG. 9, a plurality of ball bearings (not referenced) are provided to effect the abovementioned rotation of the respective gears.

In operation a gear blank is affixed to support shaft 24 and placed a predetermined indexed distance from the head assembly 16 so that upon actuation of transmission drive 21, the power screws 28 and worm shafts 32 are rotated. The rotation of power screws 28 causes a translatory movement of housing members 26 and, therefore, a similar type of movemnt of support shaft 24 and gear blank 1 in the direction shown by the arrows 29 in FIG. 8, and the rotation of the worm shafts 32 in the direction indicated by arrow 31 imparts a rotary movement to the gear blank 1 through support shaft 24 via worm gears 34. It is understood that the specific ratio of translatory movement to rotary movement is, of course, variable according to the desired radius of the curvature of the teeth to be cut, the depth, and so on.

Center shafts 60 and therefore cutter disc 62 are rotated by any known drive means located in head assembly 16, causing the cutting tools 64 to follow a circular path. The meshing of the idler gears 70 with stationary gears 66 and chuck gears 74 causes the leading face of each cutter blade to remain perpendicular to the axis of the gear blank during all cutting movements of the cutter blade.

Figure 10:
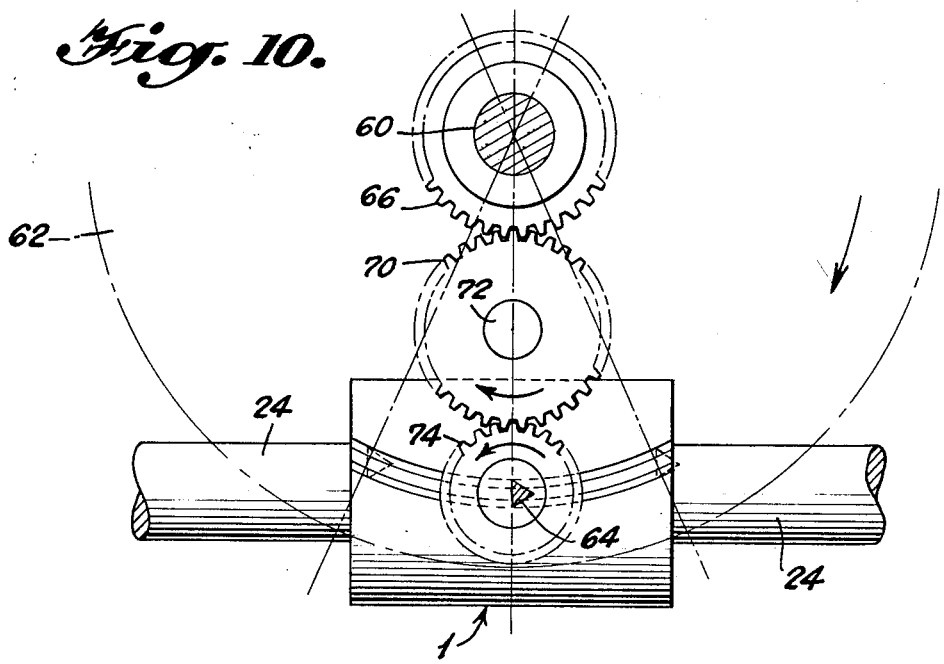
FIG. 10 is a top plan view of the cutter disc of the present invention.
Figure 11:
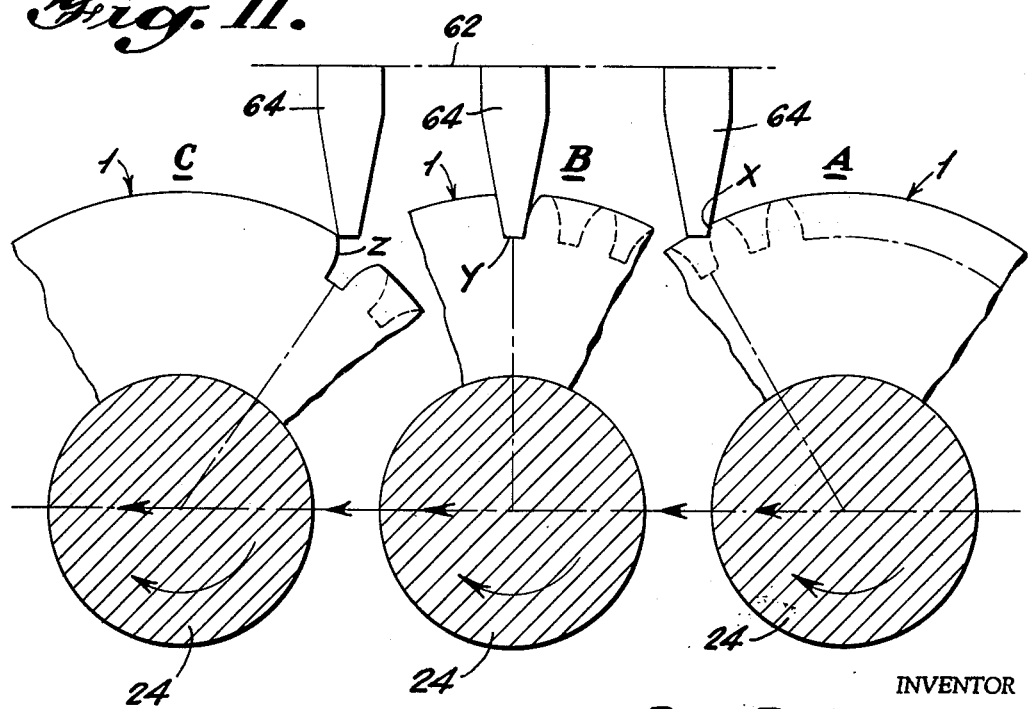
FIG. 11 is a diagrammatic view showing the mating of the cutter blades with the gear blank.

This movement, combined with the rotary and translatory movement of the gear blank 1, generates radius teeth having an involute profile as can be appreciated better from a reference to FIGS. 10 and 11. As shown, each cutter 64 cuts a relatively minute portion of the gear blank as the cutter disc 62 rotates at a relatively high rate of speed in the direction represented by the arrow on the cutter disc of FIG. 10. As the gear blank is slowly moved and rotated in the directions indicated by the arrows in FIG. 11, radius gear teeth having involute profiles are generated. Specifically, in position A of FIG. 11, the blades 64 are just beginning to engage the gear blank 1 at point X. Position B shows the arrangement after further rotation and translation of the gear blank 1, at which position the bottom land surface Y is cut. Upon continued movement of gear blank 1 to position C, the surface Z is cut to complete the formation of one tooth space. It is noted that the above movement is similar to movement of a wheel rolled along a surface with the axis of the wheel being below the surface.

Of course, it is understood that after a tooth space is cut, the gear blank is indexed backwardly or to the right as seen in FIG. 11 for generation of the next succeeding tooth, this indexing, of course, being effected manually or by any known automatic means.

It should be understood that the foregoing has been described only by way of example, and that variations can be made within the scope of the invention. For example, the gear blank may be translated in a vertical direction rather than a horizontal one as described, with the relative positions of the cutter discs, etc. being changed accordingly. Also, although a cylindrical gear blank has been described above, it could take other shapes such as conical or frusto conical. In the latter two cases, the shaft 24 would be inclined to the horizontal and the drive mechanism would be adjusted to move the ends of the shaft with the proper respective motion.

Of course, other variations of the specific construction and arrangement of the method and apparatus disclosed herein can be made by those skilled in the art.

I claim:

1. Apparatus for cutting a radius tooth gear from a gear blank, said apparatus comprising supporting means rotatable about a fixed point, at least one cutter blade carried by said support means and rotatable therewith in a generally arcuate path about said fixed point and rotatable relative to said support means, means for continuously axially translating and rotating said gear blank into said arcuate path, and means imparting relative rotary motion between said blade and said support means to maintain the leading face of said cutter blade at a predetermined constant angle relative to the axis of said gear blank during said movement of said gear blank.

2. The apparatus of claim 1 in which the support means is a disc, and a plurality of said cutter blades are mounted on said disc for rotation relative thereto and for travel with said disc in a circular path.

3. The apparatus of claim 2, wherein said means to maintain the leading face of said cutter blade at a predetermined constant angle relative to the axis of said gear blank comprises a first non-rotatable gear carried by said disc and concentric with respect to said fixed point, at least one idler gear rotatably mounted on said disc and engaging said non-rotatable gear and at least one chuck gear rotatably mounted on said disc, said cutter blade being fixedly engaged by said chuck gear.

4. The apparatus of claim 1, wherein said means for continuously axially translating and rotating said gear blank comprises a support shaft for said blank, housing means into which a portion of said support shaft extends, drive means, first shaft means rotatably driven by said drive means and threadably engaging said housing means for imparting a translatory movement to said housing means, and second shaft means rotatably driven by said drive means and operatively connected to said support shaft to rotate same.

5. The apparatus of claim 4, further comprising transmission means for varying relative rotation between said first shaft means and said second shaft means.

6. A method of cutting a radius tooth gear from a gear blank, comprising the steps of rotating a cutter blade in a generally arcuate path about a fixed point, and imparting a continuously axially translatory and rotary movemnt to said gear blank into said path while imparting rotary motion to said cutter blade relative to said path to maintain the leading face of said cutter blade at a predetermined constant angle to the axis of said gear blank.

References Cited

UNITED STATES PATENTS

| 1,355,919 | 10/1920 | Schurr | 90—5 |
| 1,364,056 | 12/1920 | Farnum | 90—5 |

GIL WEIDENFELD, Primary Examiner

U.S. Cl. X.R.

90—9.4